United States Patent Office 3,490,99[6]
Patented Jan. 20, 197[0]

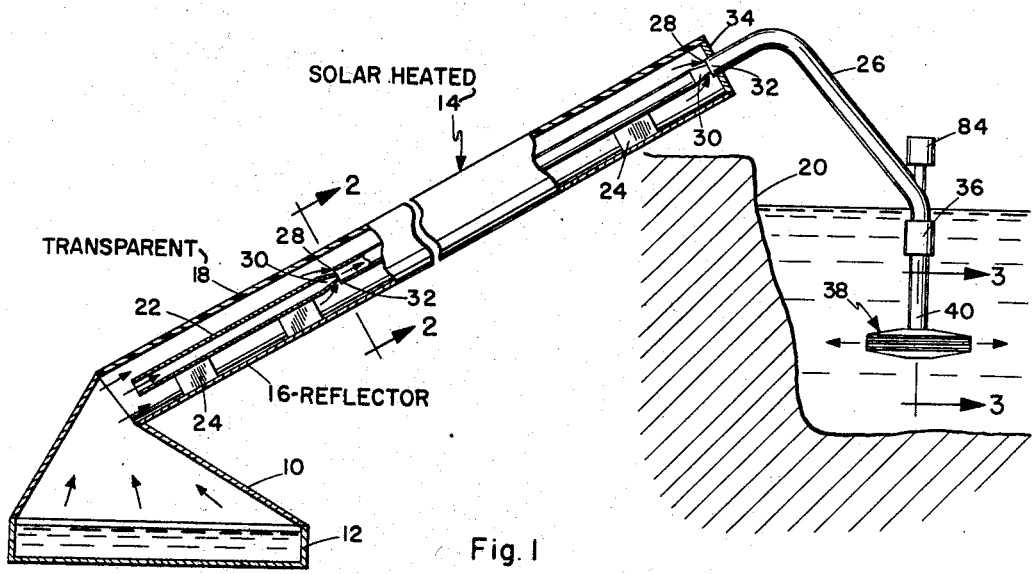
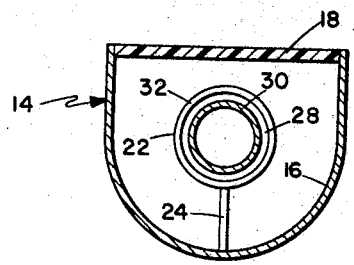
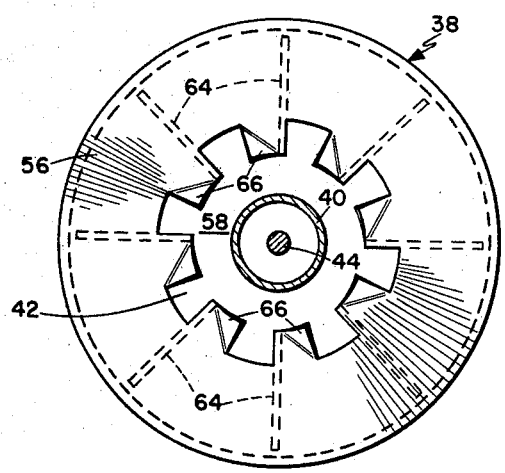
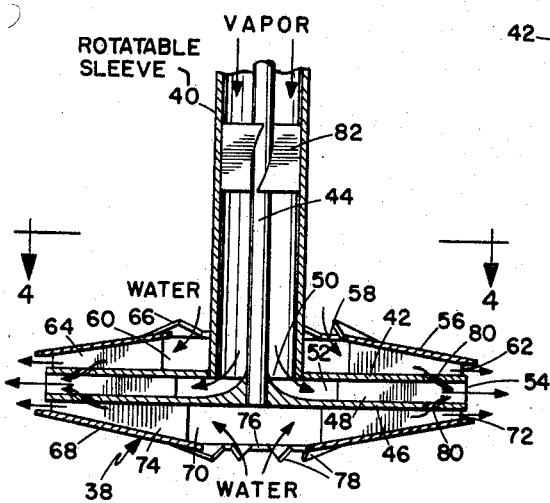

3,490,996
SOLAR HEATED WATER VAPOR LIFTING AND CONDENSING SYSTEM
Herbert C. Kelly, Jr., 5222 Cromwell Court,
San Diego, Calif. 92116
Filed Apr. 10, 1968, Ser. No. 720,151
Int. Cl. B01d 3/00; F03g 7/02
U.S. Cl. 202—234                        7 Claims

ABSTRACT OF THE DISCLOSURE

The system has means for collecting water vapor from a water source and conducting the vapor upwardly through a long solar heated duct conceived as extending up a hillside with a vertical displacement capability measured in thousands of feet, a primary flow pipe within the duct carrying a flow of vapor which reaches a high velocity and entrains secondary vapor from the duct through spaced inlets to add to the mass flow. At the upper end of the duct the vapor is fed into a centrifugal condenser, powered by the vapor flow when in full operation, the vapor being expelled and condensed at considerable depth in a reservoir by a novel action of the condenser which overcomes the head of water and prevents back pressure in the vapor pipe.

BACKGROUND OF THE INVENTION

Most solar heated water distillation systems involve large evaporating beds or complex arrays of pipes, generally all at ground level. In some systems vapor rises small distances, in pipes, to condensers and water is circulated through heat exchangers to assist condensation and extract heat to aid evaporation. With such systems pumping is necessary to obtain a practical rate of flow, usually necessitating additional power supply. The product water is stored in tanks or reservoirs and must be pumped or transported to outlets of use.

SUMMARY OF THE INVENTION

The system described herein collects vapor from the surface of a body of water into a solar heated duct, which is carried for a considerable distance, usually thousands of feet, up a hillside to a reservoir elevated well above the water source. A portion of the duct is a reflector which concentrates solar energy on a pipe through which a primary flow of vapor is conducted, the continuous heating along a great length of pipe resulting in a high velocity flow in the pipe. At intervals the pipe has inlets through which secondary vapor is entrained from the duct, the end result being a large volume, high velocity flow of vapor. At the upper end of the duct the vapor is fed into a centrifugal condenser, which is driven by the vapor flow once the system is in operation, so that no power other than solar energy is needed. The condenser is submerged at considerable depth in the reservoir to avoid surface heating and loss due to vaporization. To overcome the water pressure and prevent back pressure in the vapor pipe, the condenser uses a novel design to augment extraction and ejection of the vapor into the surrounding water by causing a pressure drop at the peripheral outlet of the condenser.

BRIEF DESCRIPTION OF THE DRAWINGS

FIGURE 1 is a diagrammatic view, partly in section, of the complete system;
FIGURE 2 is an enlarged sectional view taken on line 2—2 of FIGURE 1;
FIGURE 3 is an enlarged sectional view taken on line 3—3 of FIGURE 1; and
FIGURE 4 is a sectional view taken on line 4—4 of FIGURE 3.

Similar characters of reference indicate similar or ide[n]tical elements and portions throughout the specificati[on] and throughout the views of the drawings.

DESCRIPTION OF THE PREFERRED EMBODIMEN[T]

In the system shown in FIGURE 1, the water vapor collected in a hood 10 over an evaporating pan 12 a[nd] fed into a duct 14. The pan is intended to represent a[ny] source of water to be purified and could be of any sui[t]able size. For example, the hood could be suspended ov[er] a convenient area of a polluted lake or bay. Duct 14 is a elonagted, trough-like structure, the lower portion of whic[h] is a concave reflector 16 and the top being a transpare[nt] cover 18 which closes the duct. In a practical installatio[n] the duct would extend up a hillside with any required sui[t]able supports, for a considerable distance, on the order [of] a mile or more, to a reservoir 20 well elevated above t[he] water source. A primary purpose of the system, in addition to purifying water, is to lift the water to an elevate[d] storage facility, so that the water is readily distribute[d] without elaborate pumping and could even be used to dri[ve] power generating equipment.

Within duct 14 is a pipe 22, mounted on suitable su[p]ports 24, at the focus of reflector 16, the pipe starting [at] the lower end of the duct and extending the full length [of] the duct to a delivery pipe 26 at reservoir 20. At space[d] intervals the pipe 22 is interrupted to provide an inlet 2[8] the upper end of each section of pipe having a tapered no[z]zle 30 which fits into the lower end 32 of the next succee[d]ing length of pipe, so forming the annular inlet 28. Whe[n] the pipe 22 is heated by solar energy the vapor therein wi[ll] rise and increase in velocity. At each interruption in th[e] pipe the vapor is accelerated through the nozzle 30, caus[-]ing a pressure drop which entrains vapor, also solar heate[d] from the slower moving vapor outside the pipe and withi[n] duct 14. In this manner the concentrated heating of th[e] pipe 22 generates a high velocity vapor flow which en[-]trains further vapor along the full length of the duct an[d] results in a high mass flow at the upper end. The uppe[r] end 34 of duct 14 is closed to prevent loss of vapor. Th[e] closing of the upper end of duct 14 prevents full lengt[h] chimneying, and any cooling effect, in the duct 14. It ha[s] been found that even in a short length of duct and pip[e] structure as shown, a very considerable flow of vapor a[t] high velocity can be generated with reasonable solar heating. Parts or all of the duct can be made movable to fol[-]low the apparent motion of the sun, the technique bein[g] well known in solar energy apparatus. Over the long dis[-]tance contemplated for a fully operable system, the flow o[f] vapor would contain considerable kinetic energy, whic[h] can be used to make the system self-sustaining and self starting under ideal circumstances.

At the reservoir the delivery pipe 26 is connecte[d] through a rotary coupling 36, of any suitable type, to [a] centrifugal condenser 38 which is immersed at a substan[-]tial depth in the water. The condenser 38, as illustrated, has a central cylindrical sleeve 40 on the lower end o[f] which is affixed a radially extending circular plate 42, the upper end of said sleeve being freely rotatable in coupling 36. Coaxial with sleeve 40 is a shaft 44, on the lower end of which is a radially extending circular plate 46, similar in size to and spaced below plate 42. The plates 42 and 46 are connected by vanes 48, which are shown as being radial but could be inclined or curved for more efficient centrifugal propulsion action. The lower end of sleeve 40 has an opening 50 through plate 42 into the chamber 52 between the plates, the chamber having a peripheral outlet 54 between the edges of the plates.

Alternatively, the delivery pipe 26 may feed the condenser 38 from the bottom thereof, with mere addition of a check valve.

Above plate 42 is a shallow conical upper cap 56 having an inlet opening 58 concentric with sleeve 40 and enclosing a water chamber 60 which tapers outwardly to a narrow peripheral outlet 62 about inlet 54. Upper cap 56 is secured to plate 42 by vanes 64, which are shown as being radial but could be inclined or curved. The inlet opening 58 has circumferential blades 66 projecting radially inwardly and twisted to scoop water into chamber 60 when the condenser rotates. Below plate 46 is a shallow conical lower cap 68 enclosing a water chamber 70 with a narrow peripheral outlet 72 below outlet 54. Lower cap 68 is attached to plate 46 by vanes 74 and has a central inlet opening 76 with blades 78 to scoop in water.

In plates 42 and 46, near the outer edges, are ports 80 connecting the chambers 60 and 70 with the peripheral portion of chamber 52. Mounted on shaft 44 at a suitable position in sleeve 40 is a vaned impeller 82 for deriving rotational power from the vapor flow. For starting operation of the system the condenser 38 is rotated by a motor 84, which may be above the water as shown, or be a submersible type mounted above coupling 36.

To start operation the condenser 38 may be spun by motor 84, causing water to be drawn through inlets 58 and 76 into chambers 60 and 70 and ejected centrifugally from outlets 62 and 72. Vapor from delivery pipe 26, generated by solar energy as explained above, passes through sleeve 40 into chamber 52 and is also ejected centrifugally from outlet 54. Due to the taper of chambers 60 and 70 the water flow is accelerated outwardly, resulting in a pressure drop at the periphery. Outlets 62 and 72 thus effectively form, with outlet 54, an annular venturi providing a jet pump action by which the vapor is effectively extracted and distributed into the surrounding water while condensing. The combination of centrifugal and jet pump action is sufficient to overcome the pressure of the surrounding water, even at some depth, so that there is no back flow into the vapor pipe.

With the system in full operation the flow of vapor becomes sufficient to drive the condenser by means of the impeller 82, and motor 84 can be shut off so that the system is self-sustaining. Back pressure on the vapor column due to driving the condenser is minimized by a pressure drop at outlet 54. This is caused by water passing through ports 80 and initiating condensation at the periphery of chamber 52, resulting in a considerable reduction in volume and pressure as the vapor changes to water. In addition, the condensed purified water is centrifugally thrown more efficiently into the surrounding water than hot vapor would be.

By condensing and mixing the water at considerable depth, unnecessary heating of the surface layer of the reservoir is avoided and further evaporation is reduced. The operation can be made self-starting if the depth of the condenser is minimized, at least initially, so that back pressure is reduced, and then relatively lowered to greater depth for increased efficiency, this relative lowering being possibly accomplished by lowering the level of the accumulated water in reservoir 20. The reservoir can be at a substantial height above the water source, conceived as ordinarily measured in thousands of feet, since the water is lifted in the form of vapor which tends to rise and is further driven by solar energy. Thus the system will lift purified water to a high level reservoir without pumps or large power sources. The stored water can be distributed by gravity feed and may even be used to drive turbines for power.

It is understood that minor variation from the form of the invention disclosed herein may be made without departure from the spirit and scope of the invention, and that the specification and drawing are to be considered as merely illustrative rather than limiting.

I claim:
1. Apparatus for purifying and lifting water in the form of water vapor to a reservoir for storage of water at a great height above a source of water, comprising:
   collecting means for collecting water vapor from the source of water;
   duct means supported on a hillside and rising a great height from said collecting means to said reservoir and having a transparent cover exposed to solar energy to heat the vapor carried therein; a pipe in said duct extending substantially the length of said duct, said pipe having inlet openings at spaced intervals along its length for the flow thereinto of heated water vapor; and
   a condenser submerged in said reservoir and connected to the upper end of said duct, said condenser comprising impeller means actuated by the flow of water vapor and having means to produce negative back pressure on said duct.

2. Apparatus according to claim 1 wherein said condenser has a vapor conducting sleeve mounted for rotation about an axis;
   a radially extending vapor chamber on said sleeve with a peripheral vapor outlet;
   a water chamber on at least one side of said vapor chamber, with a substantially central inlet and a peripheral water outlet coextensive with said vapor outlet, said water chamber being tapered outwardly to increase the velocity and reduce the pressure of water at the water outlet, thereby providing a venturi effect to extract vapor from said vapor chamber.

3. Apparatus according to claim 2 wherein the vapor driven impeller is operatively connected with said sleeve to rotate said sleeve and chamber assembly.

4. The structure of claim 2, wherein said vapor and water chambers have centrifugal propelling vanes therein.

5. The structure of claim 2 and including ports opening from said water chamber into the peripheral portion of said vapor chamber.

6. The structure of claim 1, wherein said duct means includes a concave reflective portion and having said vapor conducting pipe located substantially at the focus of said concave reflective portion, said pipe being connected to said condenser, and said duct being effectively closed near the upper end thereof to prevent chimneying therein.

7. The structure of claim 1, wherein said pipe openings comprise venturi-like inlets through which vapor is entrained from said duct into the pipe.

References Cited

UNITED STATES PATENTS

| 3,138,546 | 6/1964 | Muller | 202—205 |
|---|---|---|---|
| 3,232,846 | 2/1966 | Kimmerle | 202—185 X |
| 3,290,229 | 12/1966 | Brown | 203—11 X |
| 3,300,394 | 1/1967 | Fisher | 203—10 |
| 3,338,797 | 8/1967 | Hermansen et al. | 202—234 |
| 3,359,183 | 12/1967 | Kenk | 203—10 X |
| 3,397,119 | 8/1968 | Bourland | 203—11 |
| 3,414,481 | 12/1968 | Kelly | 203—10 X |
| 3,436,908 | 4/1969 | Van Delic | 60—26 |

NORMAN YUDKOFF, Primary Examiner

F. E. DRUMMOND, Assistant Examiner

U.S. Cl. X.R.

60—26; 202—185; 203—11